United States Patent
Kim

(10) Patent No.: US 7,249,292 B2
(45) Date of Patent: Jul. 24, 2007

(54) METHOD FOR SAVING POWER IN A USER TERMINAL AFTER SYNCHRONIZATION LOSS IN BROADBAND WIRELESS ACCESS COMMUNICATION SYSTEM

(75) Inventor: Jae-Hyoung Kim, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 521 days.

(21) Appl. No.: 10/914,447

(22) Filed: Aug. 9, 2004

(65) Prior Publication Data
US 2005/0120282 A1  Jun. 2, 2005

(30) Foreign Application Priority Data
Dec. 1, 2003  (KR) .................... 10-2003-0086422

(51) Int. Cl.
*G06F 11/00* (2006.01)
*H04B 7/00* (2006.01)
(52) U.S. Cl. ................. 714/707; 714/798; 455/522
(58) Field of Classification Search .......... None
See application file for complete search history.

(56) References Cited

U.S. PATENT DOCUMENTS

| 5,884,187 A * | 3/1999 | Ziv et al. .............. 455/522 |
| 5,937,005 A * | 8/1999 | Obuchi et al. .......... 375/224 |
| 6,430,418 B1 * | 8/2002 | Nivens et al. .......... 455/522 |
| 6,622,024 B2 * | 9/2003 | Koo et al. ............. 455/522 |
| 2001/0014589 A1 * | 8/2001 | Tiedemann et al. ....... 455/69 |
| 2002/0015423 A1 * | 2/2002 | Rakib et al. ........... 370/485 |

FOREIGN PATENT DOCUMENTS

| EP | 1168663 A2 * | 1/2002 |
| JP | 409307531 A * | 5/1996 |

OTHER PUBLICATIONS

"Downlink power control of dedicated channels in UTRA TDD" by Kurjenniemi et al. The 13th IEEE International Symposium on Personal, Indoor and Mobile Radio Communications, Publication Date: Sep. 15-18, 2002 vol. 3, On pp. 1402-1406 vol. 3 ISBN: 0-7803-7589-0 INSPEC Accession No. 7678111.*

* cited by examiner

*Primary Examiner*—Cynthia Britt
(74) *Attorney, Agent, or Firm*—The Farrell Law Firm

(57) ABSTRACT

Disclosed is a method for reducing power consumption of a user terminal when synchronization between a user terminal and a base station is disrupted in a broadband wireless access communication system. The method comprises the steps of: calculating first error rate (E) based on first channel state information included in a signal transmitted from the base station; comparing the first error rate (E) with a first threshold value; determining that the synchronization is disrupted and maintaining a transmission-off mode for a predetermined period of time if the first error rate (E) is greater than the first threshold value; maintaining a reception-on mode during a period of time set for a reception mode after the transmission-off mode is performed; receiving from the base station second channel state information during the reception-on mode; calculating a second error rate (E1) based on the second channel state information; comparing the second error rate (E1) with a second threshold value; and determining that the synchronization has been reestablished and maintaining the transmission mode in a transmission-on mode if the second error rate (E1) is less than the second threshold value.

6 Claims, 2 Drawing Sheets

METHOD FOR SAVING POWER IN A USER TERMINAL AFTER SYNCHRONIZATION LOSS IN BROADBAND WIRELESS ACCESS COMMUNICATION SYSTEM

PRIORITY

This application claims priority to an application entitled "Method for Saving Power of User Terminal after Synchronization Loss in Broadband Wireless Access Communication System" filed in the Korean Industrial Property Office on Dec. 1, 2003 and assigned Ser. No. 2003-86422, the contents of which are incorporated herein by reference.

BACKGROUND OF THE INVENTION

1. Field of the Invention

The present invention relates to a broadband wireless access communication system, and more particularly to a method for reducing power consumption of a user terminal when synchronization between the user terminal and a base station is lost because of a poor channel environment in a broadband wireless access communication system such as IEEE 802.16e.

2. Description of the Related Art

With the 4th generation (hereinafter, referred to as "4G") communication system, a next generation communication system, providing users with services having various qualities of service (hereinafter, referred to as "QoS") and transmission speeds of approximately 10 Mbps are the focus of the developers.

At present, the 3rd generation (hereinafter, referred to as "3G") communication system supports a transmission speed of approximately 384 kbps in an outdoor channel environment, a relatively inferior channel environment, and supports a transmission speed of approximately 2 Mbps in an indoor channel environment, a relatively superior channel environment. A wireless local area network (hereinafter, referred to as "LAN") and a wireless metropolitan area network (hereinafter, referred to as "MAN") generally support transmission speeds of approximately 20 Mbps to 50 Mbps.

In the 4G communication system, new communication techniques are under development, which attempt to provide mobility and high QoS to the user terminal in the wireless LAN and MAN systems while attempting securing a relatively high transmission speed. Studies are also actively progressing to support a high-speed communication service, in the 4G communication system.

Since a wireless MAN system provides a wide service coverage area and supports high speed transmission, the wireless MAN system is suitable for supplying a high-speed communication service. However, the wireless MAN system does not provide for mobility of the user terminals and therefore does not provide a handoff procedure to control high-speed movement of a user terminal.

The IEEE 802.16e standard adds techniques to compensate for the mobility of a user terminal in a MAN which has a high-speed transmission function over a range of up to 75 km, while including a LAN capabilities. The IEEE 802.16e standard has been developed to provide data service, video service, voice service, etc., with a prescribed QoS in a point-to-multipoint network structure. According to such a standard, it is possible to provide broadband service on the assumption that the user terminal is fixed in its location. The IEEE 802.16e standard aims at enlarging a service area of the user terminal comparable to that of a cellular service environment by enabling the user terminal to receive services even while moving and by providing a handoff function to the user terminal on the basis of the IEEE 802.16a standard. The IEEE 802.16e standard includes link budget improvement, a plan to allow communication during a high speed movement of the user terminal, addition of a handoff function, addition of a low-power mode, etc.

According to the IEEE 802.16e, a modulation method is not fixed to any one method, but can be varied according to a channel environment. Modulation methods which can be used in the IEEE 802.16e include quadrature phase shift keying (QPSK), 16 quadrature amplitude modulation (16QAM), 64 quadrature amplitude modulation (64QAM) methods. Such modulation methods are applied as needed to adapt to a channel environment and a cell coverage range.

A base station and a user terminal must be synchronized with each other to provide communication between them according to the IEEE 802.16e. Although synchronization between the base station and the user terminal is established, the synchronization between them is frequently disrupted disconnected due to a poor channel state. The IEEE 802.16e standard does not define operations which are expected to be performed by the base station and the user terminal after synchronization between the base station and the user terminal is disrupted.

When the synchronization between the base station and the user terminal is disrupted the user terminal continues to maintain a state in which it was operating just prior to losing synchronization. Although the user terminal maintains such an operating state, it is impossible to perform communication until synchronization between the base station and the user terminal has been reestablished. Although synchronization between the base station and the user terminal is disconnected, the user terminal continues to perform full, high power operations which it was performing before the loss of synchronization, so that unnecessary power is continuously discharged.

Therefore, a technique for reducing power in a user terminal caused by unnecessary power discharge in a state in which synchronization between the user terminal and the base station is disconnected is needed. Furthermore, the continued discharge of power by the user terminal during times when synchronization is disconnected, unnecessary interference may occur between the relevant channel and an adjacent channel.

SUMMARY OF THE INVENTION

Accordingly, the present invention is provided to solve the above-mentioned problems occurring in the prior art, and an object of the present invention is to provide a method for controlling signal transmission of a user terminal in a broadband wireless access communication system, which can reduce power consumption caused by unnecessary power discharge of the user terminal when synchronization between the user terminal and a base station is disrupted.

Another object of the present invention is to provide a method for controlling signal transmission of a user terminal in a broadband wireless access communication system, which enables an adjacent channel to be less influenced by power transmitted from a user terminal which is operating in a non-synchronized state.

To accomplish these objects, in accordance with one aspect of the present invention, there is provided a method for reducing power consumption of a user terminal in a broadband wireless access communication system including the user terminal and the base station when synchronization between the user terminal and a base station is disconnected, the method comprising the steps of: calculating a first error rate (E) based on first channel state information included in a signal transmitted from the base station; comparing the first error rate (E) with a first threshold value; determining that the synchronization is disrupted and maintaining transmission-off mode for a predetermined period of time if the first error rate (E) is greater than the first threshold value; maintaining a reception-on mode during a period of time set for a reception mode after the transmission-off mode is performed; receiving from the base station second channel state information during the reception-on mode; calculating a second error rate (E1) based on the second channel state information; comparing the second error rate (E1) with a second threshold value; and determining that the synchronization has been reestablished and maintaining the transmission mode in a transmission-on mode if the second error rate (E1) is less than the second threshold value.

Preferably, the method further comprises the steps of: a) determining that the synchronization continues to be disrupted and maintaining the transmission-off mode during a period of time if the second error rate (E1) is equal to or greater than the second threshold value; b) maintaining the reception-on mode during a period of time after performing the transmission-off mode; c) receiving from the base station third channel state information during the reception-on mode to calculate a third error rate (E2); d) comparing the third error rate (E2) with the second threshold value; and e) determining that the synchronization has been reestablished and entering the transmission-on mode during period of time if the third error rate (E2) is less than the second threshold value; and.

Referring to step a) if the third error rate (E2) is equal to or greater than the second threshold value.

Herein, the channel state is information included in a downlink frame prefix. Preferably, the first threshold value is a 30% error rate and the second threshold value is a 25% error rate. Also, the broadband wireless access communication system is operating under the IEEE 802.16e standard in which a time division duplex (TDD) method is utilized.

According to the present invention, a user terminal a transmission-off mode is maintained during a state where synchronization between the user terminal and a base station is disrupted, and a transmission-on mode is maintained if it is determined that synchronization with the base station is reestablished. As a result, full power for signal transmission is not output in the disrupted state in which the user terminal loses synchronization, so that it is possible to reduce unnecessary power consumption and transmission. Also, since the base station operates according to synchronization loss of the user terminal by using a downlink frame prefix which is presented in the IEEE 802.16e standard, it is possible to reduce unnecessary power consumption in a user terminal which has lost synchronization, requiring additional message transmissions between the user terminal and the base station, so as to control an operation after the synchronization is lost.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
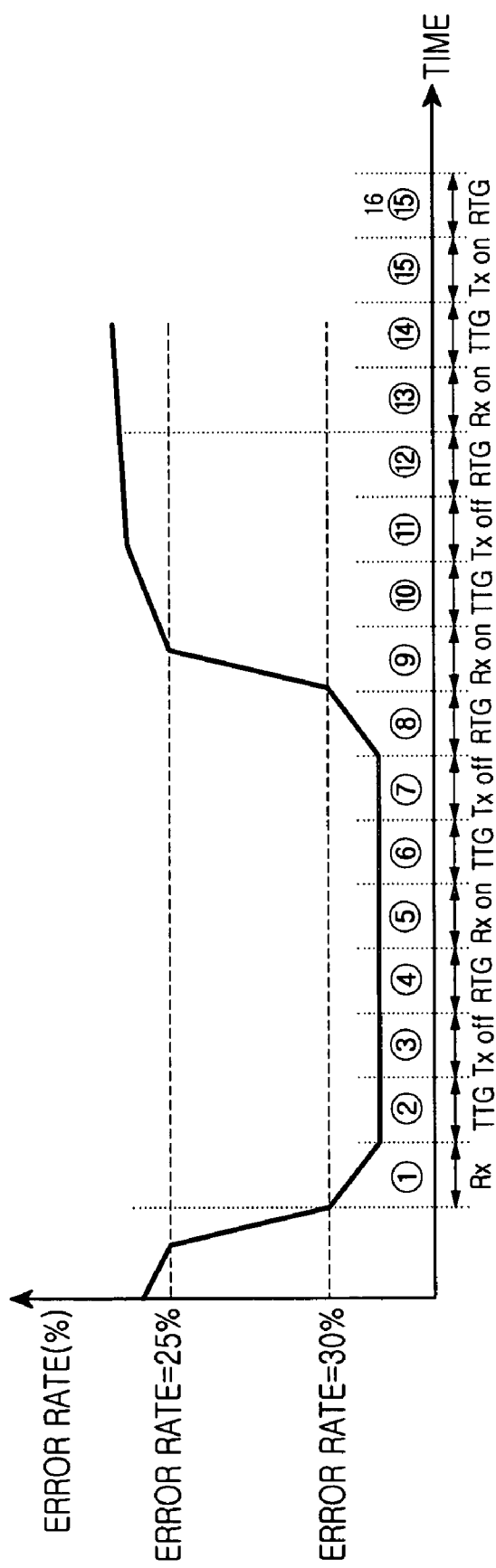
FIG. 1 is a diagram illustrating a method for controlling signal transmission in a user terminal having lost synchronization according to a preferred embodiment of the present invention.

A preferred embodiment of a method for saving power in a user terminal after synchronization is disrupted in a broadband wireless access communication system according to the present invention will be described with reference to the accompanying drawings. It is to be noted that the same elements are indicated with the same reference numerals throughout the drawings. Although a number of specific features are described below, they are presented for a better understanding of the present invention only, and it will be clear to those skilled in the art that the present invention can be practiced without such specific features. In the following description of the present invention, a detailed description of known functions and configurations incorporated herein will be omitted when it may obscure the subject matter of the present invention.

The present invention discloses a method for controlling signal transmission and saving power of a user terminal which utilizes a time division duplex (TDD) method according to the IEEE 802.16e standard when the user terminal loses synchronization with a base station. When synchronization with the base station is disrupted, the user terminal restricts unnecessary power transmission by using a transmission-off (Tx off) mode of the user terminal and adjusts the respective threshold values for power on/poweroff of the user terminal by using a hysteresis range, so that it is possible to reduce unnecessary power consumption of the user terminal and efficiently control transmission of an unnecessary signal.

The operation of this embodiment will be described in an example where a downlink preamble exists under the IEEE 802.16e standard.

When receiving a downlink preamble, the user terminal receives from the base station a downlink (DL) frame prefix in a first downlink frame. The downlink frame prefix includes information relating to modulation/coding (Rate_ID), OFDM symbol number (No_OFEM_symbols), sub-channel number (No_subchannels), and channel state (prefix_CS).

The modulation/coding information is used to notify the user terminal of modulation/coding which the base station uses in a downlink map.

The OFDM symbol number information (No_OFEM_symbols) is used to notify the user terminal of the number of OFDM symbols for a downlink map message (DL_MAP_message) beginning with a first symbol of a frame.

The sub-channel number information (No_subchannels) is used to notify the user terminal of the number of sub-channels for a downlink map message (DL_MAP_message) beginning with sub-channel No. '0'.

The channel state information (Prefix_CS) is used to by the user terminal for detecting error in a received signal.

The user terminal calculating the error rate of a received signal using the following Equation:

$$g(D)=D^8+D^2+D+1 \qquad (1)$$

where g(D) is a value generated by a cycle code and an output value of 8 bits is generated for an input value of 24 bits in this embodiment. This can be represented as (n, k)=(8, 24).

The user terminal can calculate an error rate of a received signal in a current channel state through the channel state information transmitted from the base station. In this embodiment, an error rate of a received signal, which the user terminal can calculate through the channel state information (Prefix_CS), is used as a basis for determining if the user terminal has lost synchronization with the base station. In order to determine if synchronization has been lost by using an error rate of a received signal, the user terminal compares a calculated error rate with predetermined threshold values. The threshold values are divided into a lower limit value and an upper limit value which are set as 25% and 30%, respectively.

If an error rate calculated through the channel state information of a signal received in a relevant cell coverage range is less than the lower limit value of the threshold values, that is 25%, the user terminal determines that the synchronization between the user terminal and the base station is established. If an error rate calculated through the channel state information of a signal received in a relevant cell coverage range is equal to or greater than 30%, which is the upper limit value of the threshold values, the user terminal determines that the synchronization between the user terminal and the base station has been lost.

The lower limit value and the upper limit value of the threshold values, that is 25% and 30%, are criteria for establishing a hysteresis range in which the user terminal having lost synchronization performs an operation.

FIG. 1 is a diagram illustrating a method for controlling signal transmission in a user terminal having lost synchronization according to a preferred embodiment of the present invention. This drawing shows an operation process of the user terminal based on the threshold values being the basis of determining if the synchronization is lost in a system using the time division duplex (TDD) method in the IEEE 802.16e standard. That is, FIG. 1 illustrates an operation process of the user terminal in relevant states, according to time.

As shown in FIG. 1, the user terminal is shown maintaining synchronization with a base station at an error rate, calculated through the channel state information (Prefix_CS), of less than 25%, the lower limit value of the threshold values.

When either the channel state becomes worse or the receiving power of a signal transmitted from the base station becomes weakened, the user terminal gradually loses synchronization with the base station. During these states it is difficult for the user terminal to maintain synchronization with the base station, and the error rate which the user terminal calculates through the channel state information gradually exhibits a value greater than 25%.

When, the error rate calculated by the channel state information of a received signal reaches 30%, which is the upper limit value of the threshold values, the user terminal determines that synchronization with the base station has been entirely lost.

As shown in FIG. 1, section No. 1 is a section in which the error rate reaches 30%. When the error rate reaches 30% as shown at section No. 1, the user terminal determines that synchronization with the base station has been lost, and thus changes and maintains its transmission mode (Tx mode) to a transmission-off mode (Tx off mode) so as to restrict power loss caused by unnecessary signal transmission.

For reference, in FIG. 1, 'Rx' represents a time period when the user terminal receives a signal from the base station in a reception mode, 'TTG (TX/RX transition gap)' represents a time interval during which the user terminal shifts its operation from the reception mode to a transmission mode 'Tx' represents a time period when the user terminal transmits a signal to the base station in the transmission mode, and 'RTG (RX/TX transition gap)' represents a time interval during which the user terminal shifts its operation from the transmission mode to the reception mode.

If the TTG (TX/RX Transition gap) corresponding to section No. 2 has passed, a time period reaches section No. 3 during which a transmission mode is allocated. At this time, since the user terminal has lost synchronization with the base station, it maintains its transmission mode (Tx mode) in a transmission-off mode (Tx off mode) to thereby restrict signal transmission. Therefore, it is possible to reduce power loss of the user terminal. Herein, the transmission-off mode represents a mode in which the user terminal does not transmit signals at a predetermined level of power, thereby entering a state of transmitting no signal.

After a time period set for the transmission-off mode has passed, a time period reaches section No. 4 during which a RTG (RX/TX Transition gap) range is allocated. Next, at section No. 5, the user terminal is again shifted to a reception-on mode (Rx-on mode) and receives a downlink preamble transmitted from the base station. At this time, the user terminal detects the channel state information included in a downlink frame prefix from a downlink frame of the downlink preamble. The user terminal calculates an error rate of a received signal using the detected channel state information.

If the calculated error rate is equal to or greater than 25%, the user terminal continuously maintains its transmission mode (Tx mode) in the transmission-off mode (Tx off state). During a time period for a transmission mode (Tx mode) shown at section No. 7 after a time interval for a TTG mode shown at section No. 6 has passed, the user terminal maintains its transmission mode in the transmission-off mode.

If a time period has passed section No. 8 set for a RTG mode and reaches section No. 9 during which a reception mode is allocated, the user terminal maintains a reception-on mode (Rx on mode) to receive a downlink preamble transmitted from the base station and detects a downlink frame prefix from a downlink frame of the downlink preamble. The user terminal then calculates an error rate of a received signal based on the channel state information included in the detected downlink frame prefix.

At this point in time the calculated error rate is less than 30%, which is the upper limit value of the threshold values, and even if the calculated error rate is greater than 25%, which is the lower limit value, the user terminal maintains its transmission mode in the transmission-off mode. Accordingly, if a time period has passed section No. 10 set for a TTG mode and reaches section No. 11 to which a transmission mode is allocated, the user terminal maintains its transmission mode in the transmission-off mode and does not transmit a signal. As described above, since the user terminal does not transmit a signal during a time period of a transmission mode at a state in which synchronization between the user terminal and the base station is disrupted, it is possible to prevent a predetermined level of power, which is required for transmission of a signal, from being unnecessarily consumed.

When a time period has passed section No. 12 set for a RTG mode and reaches section No. 13 to which a reception mode is allocated, the user terminal maintains a reception-on mode (Rx on mode) to receive a downlink preamble transmitted from the base station and detects a downlink frame prefix from a downlink frame of the downlink preamble. The user terminal then re-calculates an error rate of a received signal from channel state information included in the detected downlink frame prefix.

If the calculated error rate is equal to or less than 25%, the user terminal determines that synchronization between the user terminal and the base station has again been reestablished. Therefore, the user terminal performs normal communication with the base station while maintaining its transmission mode in a transmission-on mode. That is, a time period has passed section No. 14 set for a TTG mode and reaches section No. 15 to which a transmission mode is allocated, the user terminal changes and maintains its transmission mode in a transmission-on mode (Tx on mode).

As describe above, a user terminal maintains a transmission-off mode and does not transmit a signal during a state in which synchronization between the user terminal and a base station is disrupted, and a transmission-on mode is maintained if it is determined that synchronization with the base station is reestablished. Therefore, power for signal transmission is not output in the disrupted state in which the user terminal loses synchronization, so that it is possible to reduce unnecessary power consumption.

Also, since the base station controls an operation according to synchronization loss of the user terminal by using a downlink frame prefix which is presented in the IEEE 802.16e standard, it is possible to reduce unnecessary power consumption in a user terminal which has lost synchronization, without any additional message transmission between the user terminal and the base station, so as to control an operation after the synchronization loss.

Figure 2:
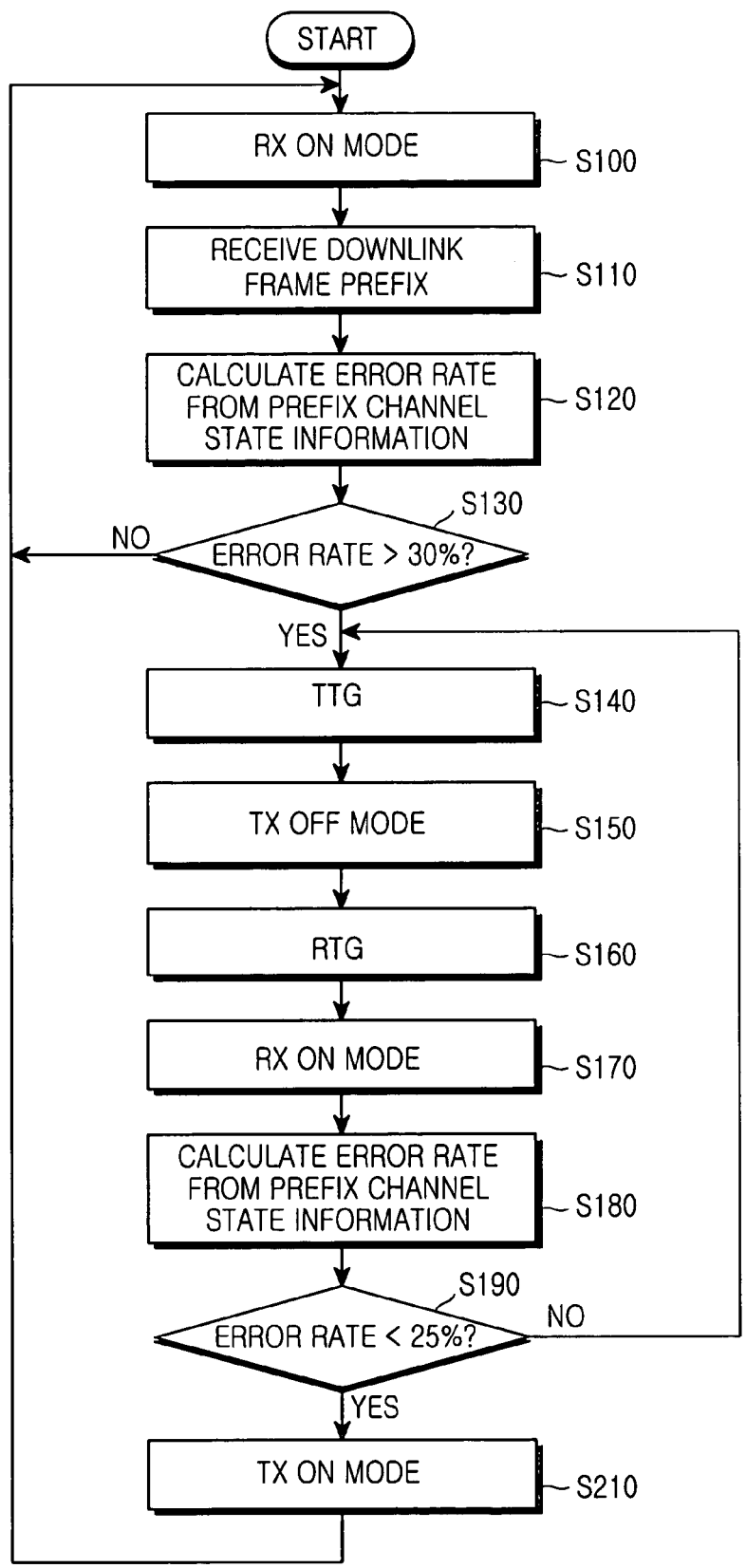
FIG. 2 is a flowchart illustrating an operation process for reducing power consumption in a user terminal having lost synchronization according to the present invention.

FIG. 2 is a flowchart illustrating an operation process for reducing power consumption in the user terminal having lost synchronization according to the present invention.

The user terminal maintains the reception-on mode (Rx on mode) (step 100), and then the user terminal receives a downlink frame prefix transmitted from the base station (step 110). The user terminal calculates an error rate of a received signal based on the channel state information included in the received downlink frame prefix (step 120).

The user terminal determines if the error rate of the received signal calculated from the channel state information is a value exceeding 30%, which is the upper limit value of the predetermined threshold values (step 130). If it is determined that the calculated error rate does not exceed 30%, the process returns to step 100. If it is determined that the calculated error rate exceeds 30%, the user terminal enters the TTG mode (step 140). When a time period for the TTG mode has passed, the user terminal enters its transmission mode in the transmission-off mode (Tx off mode) (step 150).

When the time period for the transmission-off mode has passed, the user terminal enters the RTG mode (step 160). When the RTG mode has passed, the user terminal enters its reception mode in the reception-on mode (Rx on mode) (step 170). The user terminal then receives a downlink frame prefix transmitted from the base station and calculates an error rate of a received signal based on the new channel state information included in the received downlink frame prefix (step 180).

The user terminal determines if the error rate of the received signal calculated from the channel state information is a less value than 25%, which is the lower limit value of the predetermined threshold values (step 190). If it is determined that the calculated error rate is not less than 25%, the process returns to step 140. If it is determined that the error rate is less than 25%, the user terminal enters the transmission-on mode (Tx on mode) (step 210). During the transmission-on mode, the user terminal returns to step 100.

Accordingly, a user terminal maintains a transmission-off mode and does not transmit a signal during a state in which synchronization between the user terminal and a base station is disrupted, and a transmission-on mode is entered if it is determined that synchronization with the base station is reestablished. Therefore, power for signal transmission is not output in the disrupted state in which the user terminal loses synchronization, so that it is possible to reduce unnecessary power consumption.

Also, since the base station controls an operation according to synchronization loss of the user terminal by using a downlink frame prefix which is presented in the IEEE 802.16e standard, it is possible to reduce unnecessary power consumption in a user terminal which has lost synchronization, by not having to transmit additional message transmissions between the user terminal and the base station, so as to control an operation after the synchronization loss.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for reducing power consumption of a user terminal in a broadband wireless access communication system including the user terminal and a base station when synchronization between the user terminal and a base station is disrupted, the method comprising the steps of:
   calculating a first error rate (E) based on first channel state information included in a signal transmitted from the base station;
   comparing the first error rate (E) with a first threshold value;
   determining that the synchronization is disrupted and maintaining a transmission-off mode for a predetermined period of time if the first error rate (E) is greater than the first threshold value;
   maintaining a reception-on mode during a period of time set for a reception mode after the transmission-off mode is performed;
   receiving from the base station second channel state information during the reception-on mode;
   calculating a second error rate (E1) based on the second channel state information;
   comparing the second error rate (E1) with a second threshold value; and
   determining that the synchronization based on reestablished and maintaining the transmission mode in a transmission-on mode if the second error rate (E1) is less than the second threshold value.

2. The method as claimed in claim 1, further comprising the steps of:
   a) determining that the synchronization continues to be disrupted and maintaining the transmission-off mode during a period of time if the second error rate (E1) is equal to or greater than the second threshold value;
   b) maintaining the reception-on mode during a period of time after performing the transmission-off mode;
   c) receiving from the base station third channel state information during the reception-on mode to calculate a third error rate (E2);

d) comparing the third error rate (E2) with the second threshold value; and e) determining that the synchronization has been reestablished and entering the transmission-on mode during a period of time if the third error rate (E2) is less than the second threshold value; and referring to step a) if the third error rate (E2) is equal to or greater than the second threshold value.

3. The method as claimed in claim 2, wherein the channel state information is included in a downlink frame prefix.

4. The method as claimed in claim 1, wherein the first threshold value is a 30% error rate.

5. The method as claimed in claim 1, wherein the second threshold value is a 25% error rate.

6. The method as claimed in claim 1, wherein the broadband wireless access communication system is operating under the IEEE 802.16e standard in which a time division duplex (TDD) method is utilized.

* * * * *